Re. 24507
March 1, 1955     L. C. NEUFELD     2,702,918
CONTROL DEVICE FOR WINDSHIELD CLEARING SYSTEMS
Filed June 7, 1951
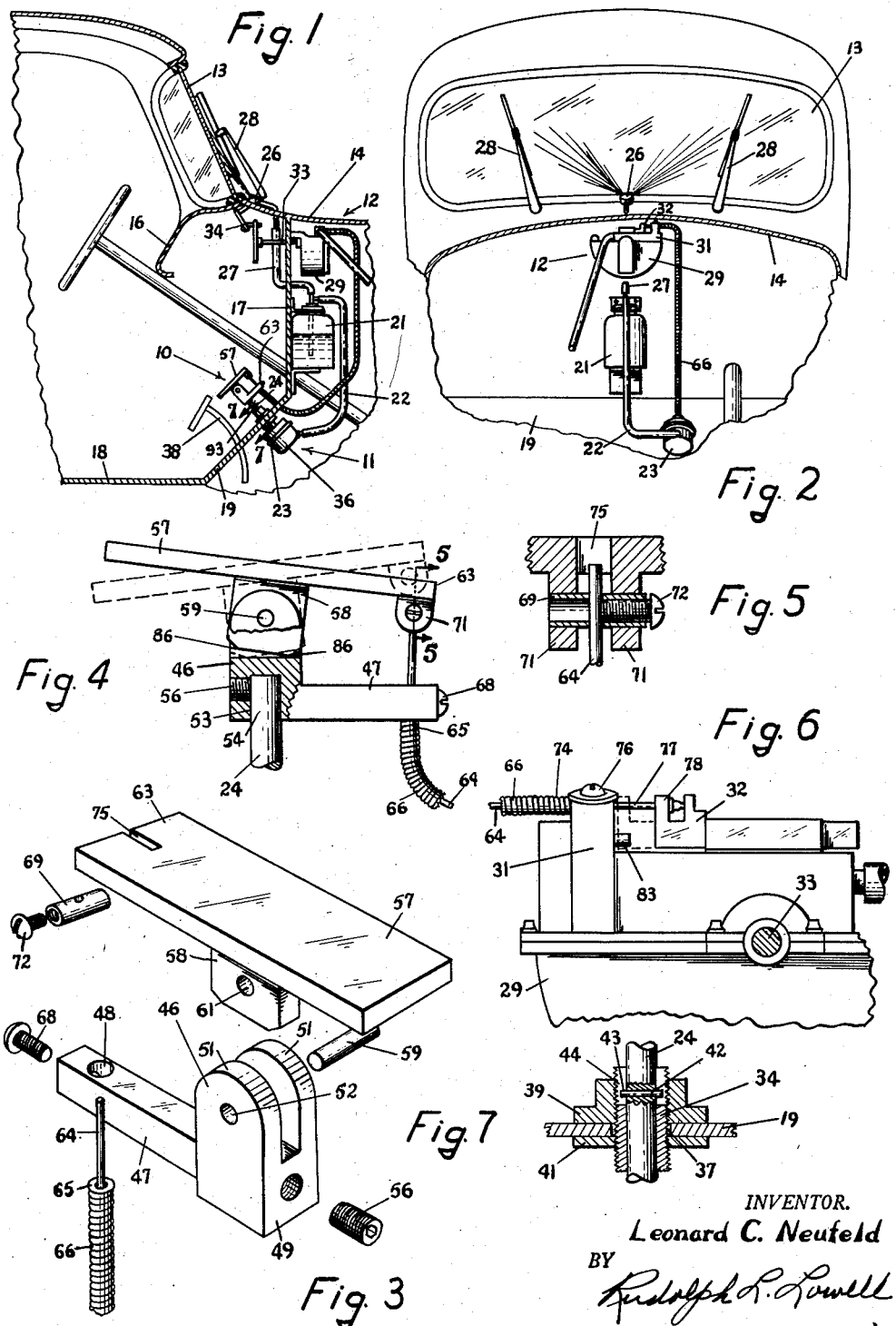
INVENTOR.
Leonard C. Neufeld
BY
Rudolph L. Lowell
atty.

United States Patent Office 2,702,918
Patented Mar. 1, 1955

2,702,918

CONTROL DEVICE FOR WINDSHIELD CLEARING SYSTEMS

Leonard C. Neufeld, Des Moines, Iowa, assignor to The Delman Company, Des Moines, Iowa, a partnership Application June 7, 1951, Serial No. 230,363

6 Claims. (Cl. 15—250.4)

This invention relates generally to vehicle windshield clearing systems and in particular to a control device for selectively or concurrently operating the wiper and washing units in such system.

Present commercially available windshield washing units are generally of two types, for supplying fluid under pressure to the windshield nozzles, namely, utilization of a valve controlled suction motor for automatically setting a pump assembly in operation and a direct actuation of a foot operated pump assembly. These washing units may be used with wiper units which are either manually, electrically or suction operated. With either of these units, however, it is necessary to manually initiate and stop the operation of the wipers so that one hand must be removed from the steering wheel for this purpose, with a consequent inconvenience to the vehicle operator and a potential hazard to safe driving.

It is an object of this invention, therefore, to provide a common control device for operating the windshield washing and wiper units in a windshield clearing system.

A further object of this invention is to provide a foot actuated control device, common to the washing and wiper units of a windshield clearing system, for selectively or concurrently operating said units.

Another object of this invention is to provide a single control device for selectively operating the wiper and washing units in a vehicle windshield clearing system, which is of a simple and compact construction, economical in cost and installation, and capable of being foot operated so as to make unnecessary the removal of a hand from the steering wheel.

A feature of this invention is to provide for use with a windshield clearing system having a foot operated washer unit and a wiper unit including a valve controlled suction motor, a control device movably mounted on the washer unit for linear and pivotal movement and connected with the suction motor valve so as to operate the wipers on pivotal actuation thereof, and to supply fluid under pressure to the windshield on linear actuation thereof.

Further objects, features and advantages of this invention will become apparent from the following description when taken in connection with the accompanying drawings in which:

Fig. 1 is a fragmentary longitudinal foreshortened sectional view of a vehicle showing a windshield clearing system embodying the control device of this invention, in assembly relation therewith;

Fig. 2 is a fragmentary front view of a vehicle showing the assembly thereon of a windshield wiping unit and windshield washing unit;

Fig. 3 is an exploded perspective view of the control device of this invention;

Fig. 4 is a reduced side elevational view of the control device shown in Fig. 3, with parts broken away for the purpose of clarity;

Fig. 5 is an enlarged sectional detail view as seen on the line 5—5 in Fig. 4;

Fig. 6 is a fragmentary front elevational view of a wiper suction motor showing the assembly relation of the control device of this invention therewith; and Fig. 7 is an enlarged sectional detail view taken substantially along the line 7—7 in Fig. 1.

With reference to the drawings, the control device of this invention, indicated generally as 10, is shown in Fig. 1 in assembly relation with a vehicle windshield washer unit and a vehicle windshield wiper unit designated generally as 11 and 12, respectively. The vehicle is illustrated as having a one piece windshield 13, an engine cowl 14 extended forwardly of the windshield, and an instrument panel or dashboard 16 located rearwardly thereof. The vehicle is further equipped with a usual fire wall 17 and floor board 18 having an upwardly and forwardly inclined portion 19 which joins with the lower end of the fire wall 17.

The washer unit 11 includes a liquid glass container or reservoir 21 connected through a fluid line 22 with a pump assembly 23, which is mounted on the inclined floor board portion 19 such that the plunger 24 thereof projects upwardly through the floor board. A nozzle 26 attached to the cowl 14 at a position forwardly of the windshield 13 is connected with the reservoir 21 through a fluid line 27. On depression of the plunger 24, fluid under pressure is supplied to the nozzle 26 for discharge upwardly onto the windshield 13 into the path of movement of wipers 28 which form part of the windshield wiping unit 12.

The plunger 24 (Figs. 1 and 7) of the pump assembly 23 is slidably supported for reciprocal movement within an externally threaded tubular bearing member 34 which projects upwardly from the pump casing 36. In the assembly with the vehicle, the bearing 34 is inserted through an opening 37 formed in the floor board portion 19 so as to extend upwardly from the floor board at a position adjacent to the vehicle clutch pedal 38 as shown in Fig. 1. Clamping nuts 39 and 41 arranged to opposite sides of the floor board portion 17 and threadable on the bearing 34, support the casing 36 in a fixed position from the lower side of the floor board portion 17.

The plunger 24 is held against rotation within the tubular bearing by the provision of a key or pin 42 extended transversely through the plunger 24 and having its ends 43 guidably received within a pair of oppositely arranged longitudinal slots 44 formed in the tubular bearing 34 substantially within the confines of the locking nut 39.

The wiper unit 12 includes a suction motor 29 having a drive shaft 33 and provided with a valve 31 (Figs. 2 and 5) which is operated by a reciprocally movable actuating member 32. The drive shaft 33 is connected with the wipers 28 through a transmission mechanism indicated at 34 in Fig. 1.

The control device of this invention is illustrated in Figs. 3 and 4 as including a bracket or support member 46 having a longitudinal body member 47 formed at one end with a vertically extended hole 48. The opposite end 49 of the body member 47 is integrally formed with a pair of upstanding transversely spaced ears or lugs 51 having aligned openings 52. Below the spaced lugs 51 is an upright cavity 53 for receiving the free or upper end 54 of the plunger 24 which is held in a fixed position relative to the bracket member 46 by the provision of a friction screw 56 extended longitudinally of the body member 47 from its end 49 for frictional engagement with the plunger 24.

A foot operated treadle member 57 of a substantially flat rectangular shape is integrally formed with a depending leg 58 which is received between the lugs 51 for support thereon by means of a pivot pin 59 extended through the openings 52 and through an opening 61 formed in the leg 58. The leg 58 is substantially intermediate the ends of the treadle member 57, and the treadle member 57 is of a length such that in its pivotally supported position on the bracket 46 the end 63 thereof terminates substantially at a position above the opening 48 in the body member 47.

Extended through the opening 48 is a Bowden wire 64 the casing 66 of which has its end 65 held fixed relative to the body member 47 by a friction screw 68. The wire 64 continues upwardly from the opening 48 for extension transversely through a tubular bearing 69, which is rotatably supported on a pair of transversely spaced lugs 71 projected downwardly from the treadle end 63 and is secured to the bearing member 69 by a friction screw 72 threadable within the bearing 69 and against the wire 64. As best appears in Fig. 5 the wire 64 is engageable with the inner adjacent sides of the lugs 71 so as to hold the bearing 69 in a supported position on the lugs.

The opposite end 74 of the wire casing 66 (Fig. 6) is secured to the valve 31 by a screw and washer assembly 76 at a position such that the working end 77 of the Bowden wire 64 is connectable with the valve actuating member 32, as indicated at 78, at a position such that the linear movement of the wire end 77 is in the same direction as the linear movement of the valve actuating member 32. The valve actuating member 32 is movable in response to the movement of the Bowden wire 64 as effected by the pivotal movement of the treadle 57.

As best appears in Fig. 1 the treadle 57 is mounted on the plunger 24 so that the treadle end 63 is located forwardly of the plunger. The wire casing 66, from the bracket 46, is then extended through the floor board portion 19 for connection to the suction motor valve 31, with the suction motor 29 being mounted on the front side of the fire wall 17.

On pivotal movement of the treadle 57 to its full line position shown in Fig. 4 to provide for a stopping of the suction motor 29, the wire 64 is moved in a downward direction, relative to the floor board portion 19, for linear movement outwardly from the end 74 of the wire casing 66 to provide for a movement of the valve actuating member 32 to its full line position shown in Fig. 6, out of engagement with the valve stem 83 of the control valve 31. On pivoted movement of the treadle 57 to its dotted line position shown in Fig. 4, the wire 64 is linearly moved inwardly within the end 74 of the wire casing 66 to in turn provide for a movement of the valve actuating member 32 toward the left, as viewed in Fig. 6, and into engagement with the valve stem 83 to move the stem to its dotted line position shown in Fig. 6. This dotted line position of the valve stem 83 provides for an operation of the suction motor 29.

As a result, the suction motor 29 is positively controlled in response to an up and down pivotal movement of the treadle 57. The pivoted movement of the treadle 57 to positions providing for a starting and stopping of the suction motor 29 as above described, is limited by the provision of oppositely arranged cam or engaging surfaces 86 (Fig. 4) formed at the lower end of the leg 58, which are independently engageable with the body member 47 of the bracket 46 at a position between the lugs 51. This pivoted movement of the treadle member 57 takes place independently of any reciprocal movement of the plunger 24 so that only the operation of the wipers 28 is controlled on pivoted movement of the treadle 57.

By pressing downwardly on the treadle 57, at any pivotally moved position therefor, the plunger 24 and treadle 57 are depressed as a unit to in turn provide for a supply of fluid under pressure to the nozzle 26. Thus fluid can be supplied to the nozzle 26 independently of the operation of the wipers 28, or the wipers 28 can be operated independently of any supply of fluid to the nozzle 26. By merely depressing the treadle 57 and plunger 24 as a unit, concurrently with pivotally moving the treadle 57 to its dotted line position shown in Fig. 4, the washer unit and the wiper unit are set into operation at the same time. A coil spring 93 mounted about the plunger 24 is arranged in compression between the bracket member 46 and the clamping nut 39. The plunger, through the treadle 57, is thus manually depressed and then returned by the action of the spring 93.

To facilitate the adjustment of the wire 66 to provide for the desired movement of the valve actuating member 32 in response to the pivoted movement of the treadle 57, the treadle 57 at its end 63, and between the spaced lugs 71 is formed with a slot 75, through which the wire 64 at the tubular member 69 can be gripped and moved relative to the wire casing 66, it being apparent that the friction screw 72 is released while the adjustment is taking place.

Although the control device 10 of this invention has been described relative to its application to a suction operation of the wipers 28, it will be appreciated that it can be readily applied to other sources of power for operating the wipers, such as an electric motor, or to a clutch mechanism where the wipers are to be operated from a moving part of the vehicle engine.

Further although the invention has been described with respect to a preferred embodiment thereof it is to be understood that it is not to be so limited since changes can be made therein which are within the full intended scope of this invention as defined by the appended claims.

I claim:

1. For use with a vehicle having a windshield wiping unit including wipers and a source of power with a control mechanism therefor for operating said wipers, and a windshield washing unit including a nozzle and a pump assembly having a reciprocally movable foot operated plunger for supplying fluid under pressure to said nozzle and in which the plunger is projected upwardly from the floor board of the vehicle, a control device for selectively or concurrently operating said two units including a foot operated treadle, means pivotally mounting said treadle on said plunger for up and down pivotal movement, and a movable member movably connected to said treadle and to said control mechanism responsive in movement to the pivotal movement of said treadle to control the operation of said wipers, with said plunger being moved by a downward pressure applied on said treadle at said pivot means.

2. For use with a vehicle having a windshield wiping unit including wipers and a motor for operating said wipers having a control means, and a windshield washing unit including a nozzle and a pump assembly for supplying fluid under pressure to said nozzle in which the fluid is supplied to the nozzle in response to a manual depressing movement of the pump plunger, a control device for selectively or concurrently operating said two units including a pivoted actuating member, means pivotally supporting said actuating member on said plunger for pivotal movement relative to said plunger in a plane extended longitudinally of said plunger, means operatively associated with said actuating member and the control means for said motor to control the operation of said motor in response to a pivotal movement of said actuating member, with movement of said actuating member, as a unit with said plunger, providing for the supply of fluid under pressure to said nozzle.

3. For use with a vehicle having a windshield wiping unit including wiper blades and a wiper operating motor with means for controlling the operation of said motor, and a windshield washing unit having a nozzle and a foot operated pump assembly wherein a reciprocally movable plunger has one end projected upwardly through the vehicle floor board to be depressed by foot to supply fluid under pressure to the nozzle, a control device for selectively or concurrently operating said two units including a bracket member mounted on the projected end of the plunger, means for holding said plunger against rotational movement, a foot treadle, and means pivotally supporting said foot treadle on said bracket member for pivotal movement in a plane longitudinally of said plunger, movable means connected to one end of said treadle and to said motor control means movable in response to the pivotal movement of said treadle to control the operation of said rotor, with said treadle, bracket and plunger being depressed as a unit to supply fluid under pressure to said nozzle.

4. For use with a vehicle having a windshield wiping unit including wiper blades, a valve controlled suction motor for operating said wiper blades having a valve actuating member, and a windshield washer unit including a nozzle and a pump assembly the plunger of which is foot depressed to supply fluid under pressure to said nozzle, the means for operating said two units concurrently or selectively which includes a support member mounted on the free end of said plunger, a foot operated treadle member, means pivotally supporting said treadle intermediate the ends thereof on said support member for pivotal movement in a plane longitudinally of said plunger, co-acting portions on said treadle and support member for limiting the pivotal movement of said treadle, and movable means connected to said valve actuating member and to one end of said treadle for moving said valve actuating member in response to the pivotal movement of said treadle, with said treadle being depressible as a unit with said plunger at any pivotally moved position of said treadle.

5. For use with a vehicle having a windshield wiping unit including wipers and a power unit for operating said wipers, and a windshield washing unit including a nozzle and a pump assembly in which a reciprocally movable member is depressed to supply fluid under pressure to said nozzle, a control device for selectively or concurrently operating said two units including an actuating member mounted on said movable member for reciprocal movement therewith and for pivotal movement relative thereto, and means operatively associated with said actuating member and said power unit for controlling the operation of said power unit in response to a pivotal movement of said actuating member, with said movable member and actuating member being reciprocally movable as a unit at any pivotally moved position of said actuating member.

6. For use with a vehicle having a floorboard, a windshield wiping system including wipers and a power unit for operating said wipers, and a windshield washing unit including a nozzle and a pump assembly mounted on said floorboard, said pump assembly including a working member which is depressed to supply fluid under pressure to said nozzle, a control device for concurrently operating said two units including an actuating lever for depressing said working member, means mounting said lever on said pump assembly for pivotal movement relative to said pump assembly, and a flexible member connected to and extended between said actuating lever and said power unit for controlling the operation of said power unit in response to a pivotal movement of said actuating lever.

References Cited in the file of this patent

UNITED STATES PATENTS

| | | |
|---|---|---|
| 1,910,412 | Staude | May 23, 1933 |
| 2,068,962 | Stanford | Jan. 26, 1937 |
| 2,323,470 | Horton | July 6, 1943 |
| 2,332,122 | Vaughn | Oct. 19, 1943 |
| 2,572,264 | Horton | Oct. 23, 1951 |